(12) United States Patent
Kim

(10) Patent No.: US 12,399,931 B2
(45) Date of Patent: Aug. 26, 2025

(54) DEVICE AND METHOD FOR CONTROLLING VEHICLE

(71) Applicants: Hyundai Motor Company, Seoul (KR); Kia Corporation, Seoul (KR)

(72) Inventor: Dong Hyuk Kim, Hanam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/510,035

(22) Filed: Nov. 15, 2023

(65) Prior Publication Data

US 2024/0411799 A1 Dec. 12, 2024

(30) Foreign Application Priority Data

Jun. 7, 2023 (KR) .......................... 10-2023-0073043

(51) Int. Cl.
*G06F 16/00* (2019.01)
*G06F 16/435* (2019.01)
*H04N 21/414* (2011.01)

(52) U.S. Cl.
CPC ..... *G06F 16/435* (2019.01); *H04N 21/41422* (2013.01)

(58) Field of Classification Search
None
See application file for complete search history.

(56) References Cited

U.S. PATENT DOCUMENTS

| | | | |
|---|---|---|---|
| 2015/0094897 A1* | 4/2015 | Cuddihy | H04N 21/4122 701/23 |
| 2015/0350709 A1* | 12/2015 | Tomita | H04N 21/462 725/32 |
| 2020/0011678 A1* | 1/2020 | Patel | H04N 21/41422 |
| 2020/0019161 A1* | 1/2020 | Stenneth | G08G 1/096725 |
| 2020/0168006 A1* | 5/2020 | Kuramochi | H04W 4/40 |
| 2020/0249697 A1* | 8/2020 | Hayes | G05D 1/0291 |
| 2021/0234932 A1* | 7/2021 | Sobhany | H04L 67/52 |

* cited by examiner

*Primary Examiner* — Anhtai V Tran
(74) *Attorney, Agent, or Firm* — Banner & Witcoff, Ltd.

(57) ABSTRACT

The present disclosure relates to a device and a method for controlling a vehicle. The device includes memory that stores program instructions, and a processor that executes the program instructions. The processor outputs, via a display of the vehicle and/or an audio system of the vehicle, an available autonomous driving travel time associated with a portion, of a travel route to a destination, that is suitable for autonomous driving. The available autonomous driving travel time is determined based on a location of the vehicle. Based on a determination that autonomous driving is activated for the vehicle, the processor allows media playback of in the vehicle.

20 Claims, 11 Drawing Sheets

DEVICE AND METHOD FOR CONTROLLING VEHICLE

CROSS-REFERENCE TO RELATED APPLICATION

This application claims the benefit of priority to Korean Patent Application No. 10-2023-0073043, filed in the Korean Intellectual Property Office on Jun. 7, 2023, the entire contents of which are incorporated herein by reference.

TECHNICAL FIELD

The present disclosure relates to a device and a method for controlling a vehicle, and more specifically, to technologies for managing time for autonomous driving to a destination.

BACKGROUND

As technologies for electric vehicles continue advance, autonomous driving is increasing in demand. An autonomous vehicle refers to a vehicle that is capable of traveling to a destination by itself without little to no driver manipulation. The autonomous vehicle may drive itself to the destination by analyzing and reacting to its surrounding environment.

In several countries, displaying a video inside the vehicle to be visible to the driver while the vehicle is moving is regulated by law. For example, local laws may prohibit a video from being displayed via a device for receiving or playing video content such as broadcast television while the vehicle is being driven.

Accordingly, an automatic blocking function is typically installed to prevent any information, other than travel information such as a route guidance and a rear camera video, from being provided as a moving or still image when the vehicle is traveling.

However, if an autonomous driving system is used for driving, there may not be a need to restrict use of a mobile phone or to prevent the video from being displayed at location inside the vehicle where the video may be visible to the vehicle occupants while the vehicle is moving. The autonomous driving system described above may be classified as a partial autonomous driving system, a conditional complete autonomous driving or a complete autonomous driving system.

Specifically, the partial autonomous driving system may refer to an autonomous driving system that operates the vehicle under specified conditions but requires intervention of the driver when necessary, such as a limited operation situation. The conditional complete autonomous driving system may refer to an autonomous driving system that operates the vehicle without the intervention of the driver under specified conditions. The complete autonomous driving system may refer to an autonomous driving system that operates the vehicle without the intervention of the driver under all circumstances. As autonomous driving technology becomes more widespread, there may be a growing need for a technology that allows multimedia-related convenience functions such as video viewing to be utilized while the vehicle is moving.

SUMMARY

The present disclosure has been made to solve the above-mentioned problems occurring in the prior art while advantages achieved by the prior art are maintained intact.

An aspect of the present disclosure provides a device and a method for controlling a vehicle that enable a user to use various convenience functions available within an available time for autonomous driving by providing the user with available time for autonomous driving in an entire travel route to a destination.

Another aspect of the present disclosure provides a device and a method for controlling a vehicle that enable a user to use a multimedia function within an available time for autonomous driving by determining whether the vehicle is under autonomously driving and, when the vehicle is under the autonomous driving, allowing media playback.

Another aspect of the present disclosure provides a device and a method for controlling a vehicle that enhance convenience when a user selects content that may be utilized within an available time for autonomous driving by recommending content that may complete playback within the available time for autonomous driving or recommending a playback speed of multimedia for completing the playback within the available time for autonomous driving.

Another aspect of the present disclosure provides a device and a method for controlling a vehicle that allow a user to actively respond to an event in which autonomous driving cannot be maintained and improve convenience in utilizing multimedia by displaying an available time for autonomous driving in second units or displaying an event occurrence point on a display when the event in which the autonomous driving is not able to be continued occurs during the autonomous driving of the vehicle.

The technical problems to be solved by the present disclosure are not limited to the aforementioned problems, and any other technical problems not mentioned herein will be clearly understood from the following description by those skilled in the art to which the present disclosure pertains.

According to one or more example embodiments of the present disclosure, a device for controlling a vehicle may include: memory configured to store program instructions, and a processor configured to execute the program instructions. The processor may be configured to output, via at least one of a display of the vehicle or an audio system of the vehicle, an available autonomous driving travel time associated with a portion, of a travel route to a destination, that is suitable for autonomous driving. The available autonomous driving travel time may be determined based on a location of the vehicle. The processor may further be configured to, based on a determination that autonomous driving is activated for the vehicle, allow media playback in the vehicle.

The processor may be configured to output the available autonomous driving travel time by displaying at least one of: an entirety of the travel route, the portion suitable for autonomous driving, the available autonomous driving travel time associated with the portion suitable for autonomous driving, or the location of the vehicle on the travel route.

The processor may be further configured to determine a recommended media content having a playback time that is less than or equal to the available autonomous driving travel time.

The processor may be further configured to determine, based on a playback time of a media content being greater than the available autonomous driving travel time, a recommended playback speed of the media content for completing playback of the media content within the available autonomous driving travel time.

The processor may be further configured to: receive a selection of a playback speed; and determine a recommended media content. A playback time of the recommended media content at the selected playback speed may be less than or equal to the available autonomous driving travel time.

The processor may be further configured to: start playback of a media content based on autonomous driving of the vehicle being activated; pause playback of the media content based on autonomous driving being deactivated; and resume playback of the media content from a paused position based on autonomous driving being re-activated.

The processor may be further configured to: based on the portion, of the travel route, comprising at least two separate sections of the travel route, output, via at least one of the display or the audio system: at least two travel times, each associated with a respective section of the at least two separate sections of the travel route, and the at least two separate sections of the travel route. The at least two travel times may be determined based on the location of the vehicle in one of the at least two separate sections of the travel route.

The processor may be configured to output the available autonomous driving travel time based on an event that causes autonomous driving to be deactivated.

The processor may be further configured to, based on an event that causes autonomous driving to be deactivated, store in the memory or display: the portion, of the travel route, suitable for autonomous driving, and a location where the event has occurred.

The processor may be further configured to provide the available autonomous driving travel time to a terminal. The terminal may be connected to the vehicle via a wired or wireless connection.

According to one or more example embodiments of the present disclosure, a method for controlling a vehicle may include: outputting, by a processor and via at least one of a display of the vehicle or an audio system of the vehicle, an available autonomous driving travel time associated with a portion, of a travel route to a destination, that is suitable for autonomous driving. The available autonomous driving travel time may be determined based on a location of the vehicle. The method may further include, based on a determination that autonomous driving is activated for the vehicle, allowing, by the processor, media playback in the vehicle.

Outputting the available autonomous driving travel time comprises: displaying at least one of: an entirety of the travel route, the portion suitable for autonomous driving, the travel time associated with the portion suitable for autonomous driving, or the location of the vehicle on the travel route.

The method may further include: determining a recommended media content having a playback time that is less than or equal to the available autonomous driving travel time.

The method may further include: determining, based on a playback time of a media content being greater than the available autonomous driving travel time, a recommended playback speed of the media content for completing playback of the media content within the available autonomous driving travel time.

The method may further include: receiving a selection of a playback speed; and determining a recommended media content. A playback time of the recommended media content at the selected playback speed may be less than or equal to the available autonomous driving travel time.

The method may further include: starting playback of a media content based on autonomous driving of the vehicle being activated; pausing, by the processor, playback of the media content based on autonomous driving being deactivated; and resuming playback of the media content from a paused position based on autonomous driving being re-activated.

The method may further include: based on the portion, of the travel route, comprising at least two separate sections of the travel route, outputting, by the processor via at least one of the display or the audio system: at least two travel times, each associated with a respective section of the at least two separate sections of the travel route, and the at least two separate sections of the travel route. The at least two travel times may be determined based on the location of the vehicle in one of the at least two separate sections of the travel route.

Outputting the available autonomous driving travel time may outputting the available autonomous driving travel time based on an event that causes autonomous driving to be deactivated.

The method may further include: based on an event that causes autonomous driving to be deactivated, storing or displaying: the portion, of the travel route, suitable for autonomous driving, and a location where the event has occurred.

The method may further include: providing, by the processor, the available autonomous driving travel time to a terminal, wherein the terminal is connected to the vehicle via a wired or wireless connection.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
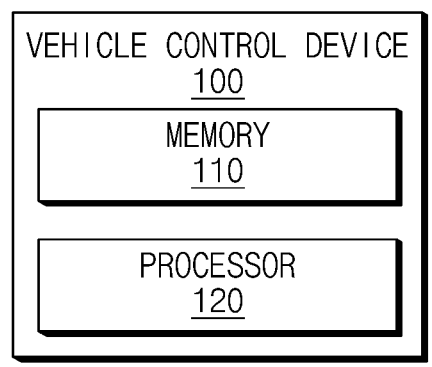
FIG. 1 is a block diagram showing a vehicle control device.

Hereinafter, one or more example embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the example embodiment(s) of the present disclosure, a detailed description of the related known configuration or function will be omitted when it is determined that it interferes with the understanding of the example embodiment(s) of the present disclosure.

In describing the components of the one or more example embodiments according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, one or more example embodiments of the present disclosure will be described in detail with reference to FIGS. 1 to 10.

Prior to description, autonomous driving to be mentioned below may include partial autonomous driving that operates a vehicle under specified conditions but requires intervention of a driver if necessary, such as an operation limiting situation, conditional complete autonomous driving system that operates the vehicle without the intervention of the driver under specified conditions, and complete autonomous driving system that operates the vehicle without the intervention of the driver in all areas.

FIG. 1 is a block diagram showing a vehicle control device.

A vehicle control device 100 may include a memory 110 and a processor 120. A configuration of the vehicle control device 100 shown in FIG. 1 is an example, and embodiments of the present disclosure are not limited thereto. For example, the vehicle control device 100 may further include components not shown in FIG. 1.

The memory 110 may store commands or data. For example, the memory 110 may store one instruction or two or more instructions that, when executed by the processor 120, cause the vehicle control device 100 to perform various operations.

The memory 110 may be implemented as a single chipset with the processor 120, and may store various information related to the vehicle control device 100. For example, the memory 110 may store information on an operation history of the processor 120.

The processor 120 may y provide (e.g., output) an available time for autonomous driving (e.g., an autonomous driving travel time) calculated in the vehicle to at least one of a display or an audio of the vehicle, or any combination thereof.

For example, the processor 120 may display at least one of an entire travel route, an autonomous driving available section (e.g., a portion, of the travel route, that is suitable for autonomous driving), the available time for autonomous driving, or a location of the vehicle on the entire travel route, or any combination thereof on the display of the vehicle.

In this regard, the display of the vehicle may include at least one of a cluster, a head-up display (HUD), center information display (CID), a co-driver display (CDD), a side mirror display, or a rear seat entertainment display, or any combination thereof.

The autonomous driving available section may include a road section where the vehicle may travel in an autonomous driving mode in the entire travel route to a destination. The autonomous driving available section may be determined based on map information, and the map information including the autonomous driving available section may be stored in the memory 110 of the vehicle.

For example, the autonomous driving available section may be displayed on the display based on a ratio of a length of the section where the autonomous driving is available to a length of the entire travel route. In addition, the autonomous driving available section may be distinguished from a section where the vehicle is not able to travel in the autonomous driving mode in the entire travel route, and the autonomous driving available section and the section where the vehicle is not able to travel in the autonomous driving mode may be displayed in different colors on the display. For example, the autonomous driving available section may be displayed on the display in blue, and the section where the vehicle is not able to travel in the autonomous driving mode may be displayed on the display in white.

The available time for autonomous driving may include a time required in the autonomous driving available section based on the location of the vehicle on the entire travel route to the destination. In this regard, the destination may be input by a user, or the destination set in advance via a vehicle controller, a wired/wireless terminal, or the like may be provided to the vehicle control device 100.

As an example, the available time for autonomous driving may mean a time during which the vehicle may travel in the autonomous driving mode. As a specific example, the available time for autonomous driving may be continuously updated and calculated in consideration of conditions such as at least one of the autonomous driving available section, a speed of the vehicle, or traffic conditions up to the destination, or any combination thereof.

For example, if the vehicle is traveling in the section where the vehicle is not able to travel in the autonomous driving mode, the available time for autonomous driving may be an available time for autonomous driving in an autonomous driving available section that comes first. If the vehicle is traveling in the autonomous driving available section, the available time for autonomous driving may mean a remaining available time for autonomous driving in the corresponding autonomous driving available section.

The location of the vehicle displayed on the display may be displayed on the entire travel route. For example, the location of the vehicle may be displayed as an icon, an image, or the like that may represent the vehicle.

As an example, if the number of autonomous driving available sections in the entire travel route of the vehicle is equal to or longer than two, the processor 120 may provide at least two available times for autonomous driving respectively corresponding to the at least two autonomous driving available sections, and the at least two autonomous driving available sections to at least one of the display or the audio of the vehicle, or any combination thereof.

For example, if the autonomous driving available sections in the entire travel route are composed of a first autonomous driving available section and a second autonomous driving available section that are not contiguous with each other, the processor 120 may display the first autonomous driving available section based on a ratio of a length of the first autonomous driving available section to the length of the entire travel route, and display the second autonomous driving available section on the display based on a ratio of a length of the second autonomous driving available section to the length of the entire travel route. In addition, a first available time for autonomous driving corresponding to the first autonomous driving available section and second available time for autonomous driving corresponding to the second autonomous driving available section may be displayed on the display.

For example, if the number of autonomous driving available sections in the entire travel route of the vehicle is equal to or longer than two, the processor 120 may provide the available time for autonomous driving in the autonomous driving available section based on the location of the vehicle in addition to the available times for autonomous driving respectively corresponding to the at least two autonomous driving available sections to at least one of the display or the audio of the vehicle, or any combination thereof.

For example, if the autonomous driving available sections in the entire travel route are composed of the first autonomous driving available section and the second autonomous driving available section that are not contiguous with each other, in a case in which the location of the vehicle is the first autonomous driving available section, the processor 120 may display a remaining available time for autonomous driving until the first autonomous driving available section ends based on the current location of the vehicle separately on the display of the vehicle. As an example, if the first available time for autonomous driving corresponding to the first autonomous driving available section is 1 hour and 26 minutes and the second time available for autonomous driving corresponding to the second autonomous driving available section is 2 hours 12 minutes, in a case in which the vehicle currently has traveled for 23 minutes in the first autonomous driving available section, the processor 120 may separately display 1 hour and 03 minutes, which is the remaining available time for autonomous driving until the first autonomous driving available section ends, on the display.

For example, the processor 120 may determine whether the vehicle is under the autonomous driving (e.g., autonomous driving for the vehicle is activated), and allow playback of multimedia (e.g., allow media playback) if the vehicle is under the autonomous driving (e.g., autonomous driving for the vehicle is activated). For example, the processor 120 may control the user to play the multimedia such as a video if the vehicle is traveling in the autonomous driving mode, and control the user not to play the multimedia such as the video if the vehicle is not traveling in the autonomous driving mode.

For example, the processor 120 may compare the available time for autonomous driving with a playback time of content and recommend content (e.g., determine a recommended media content) having the same playback time as the available time for autonomous driving to the user or recommend content with a playback time shorter than the available time for autonomous driving to the user. In other words, the recommended media content may have a playback time that is less than or equal to the autonomous driving travel time. In this regard, the content may include a playback object, a playback item, or the like that is played via the multimedia. For example, if the available time for autonomous driving is 1 hour 26 minutes, the processor 120 may recommend content with a playback time equal to 1 hour 26 minutes or shorter than 1 hour 26 minutes to the user. In this case, the recommended content may be a plurality of content.

For example, if the playback time of the content is longer than the available time for autonomous driving, the processor 120 may recommend a playback speed (e.g., determine a recommended playback speed) of at least one multimedia that may complete the playback of the content within the available time for autonomous driving. For example, if a playback time of content selected by the user is twice the available time for autonomous driving, the processor 120 may recommend a playback speed of the multimedia that corresponds to a 2× speed or higher at which the playback of the corresponding content may be completed within the available time for autonomous driving.

As another example, if the user selects a playback speed (e.g., if the vehicle receives a selection of a playback speed) at which the playback cannot be completed within the available time for autonomous while selecting driving multimedia, the processor 120 may provide a notification indicating that the multimedia playback is not able to be completed or recommend a playback speed at which the playback is completed to the user in consideration of an autonomous driving time. For example, in the case in which the available time for autonomous driving is 1 hour 26 minutes, if the user selects multimedia whose playback time is 2 hours 52 minutes with a playback speed that is a 1× speed, the processor 120 may provide a notification indicating that the playback is not able to be completed within the driving available time at the playback speed that is the 1× speed, or recommend the playback speed that is the 2× speed or higher at which the playback is able to be completed.

As another example, if the playback speed of the multimedia is selected first, the processor 120 may recommend complete playback of the at least one content that may multimedia within the available time for autonomous driving if the playback is performed at the selected playback speed. For example, in the case in which the available time for autonomous driving is 1 hour 26 minutes, if the user selects the playback speed of the multimedia that is the 2× speed, the processor 120 may recommend content with a playback time equal to or shorter than 2 hours 52 minutes that may be completely played at the playback speed that is the 2× speed.

For example, the processor 120 may recommend content that may be played for each playback speed in consideration of the available time for autonomous driving. For example, at least one of a playable content video list if the 1× playback speed is selected, a playable content video list if a 1.5× playback speed is selected, or a playable content video list if the 2× playback speed is selected, or any combination thereof may be displayed on the display.

For example, if the multimedia is being played (e.g., playback of a media content is started) while the vehicle is under the autonomous driving (e.g., autonomous driving of the vehicle is activated), the processor 120 may pause playback of the multimedia if the autonomous driving is released (e.g., autonomous driving for the vehicle is deactivated). That is, if the autonomous driving mode is released by the user or by the vehicle while the vehicle is traveling in the autonomous driving mode and the multimedia is being played, the processor 120 may temporarily stop the multimedia that is being played by disallowing the playback of the multimedia. In addition, if the autonomous driving of the vehicle is resumed again (e.g., autonomous driving for the vehicle is re-activated), the processor 120 may allow the paused multimedia to be played continuously (e.g., resume playback of the media content) from a paused portion (e.g., a position, within the media content, at which playback had been paused). That is, if the autonomous driving mode is resumed by the user or systemically while traveling in a general driving mode, the processor 120 may allow the paused multimedia to be played again by allowing the playback of the multimedia again.

For example, if the number of autonomous driving available sections in the entire travel route of the vehicle is equal to or longer than two, the processor 120 may compare a total available time for autonomous driving, which is a sum of the at least two available times for autonomous driving respectively corresponding to the at least two autonomous driving available sections (e.g., at least two separate sections of the travel route), with the playback time of the content, and recommend content to the user.

As a specific example, content having a playback time the same as the total available time for autonomous driving, which is the sum of the at least two available times for autonomous driving, or a playback time shorter than the total available time for autonomous driving may be recommended. For example, if the autonomous driving available sections in the entire travel route are composed of the first autonomous driving available section and the second autonomous driving available section that are not contiguous with each other, in the case in which the first available time for autonomous driving corresponding to the first autonomous driving available section is 1 hour 26 minutes and the second available time for autonomous corresponding to the second autonomous driving available section is 2 hours 12 minutes, the processor 120 may compare the playback time of the content with 3 hours and 38 minutes, which is the total available time for autonomous driving that is the sum of 1 hour 26 minutes, which is the first available time for autonomous driving, and 2 hours 12 minutes, which is the second available time for autonomous driving. In addition, the processor 120 may recommend content having a playback time equal to 3 hours 38 minutes or shorter than 3 hours 38 minutes.

As another example, if there are at least two content that may complete the playback within the total available time for autonomous driving, all of the at least two content may be recommended.

As an example, if the numbers of autonomous driving available sections in the entire travel route of the vehicle and the available times for autonomous driving corresponding thereto are equal to or longer than two, in a case in which the playback time of the content is longer than the total available time for autonomous driving, which is the sum of the at least two available times for autonomous driving, the processor 120 may recommend the playback speed of the at least one multimedia that may complete the playback of the content within the total available time for autonomous driving.

As an example, in the case in which the number of autonomous driving available sections in the entire travel route of the vehicle is equal to or longer than two, the processor 120 may not allow the playback of the multimedia in the section where the autonomous driving is not available that exists between the at least two autonomous driving available sections. For example, in the case in which the autonomous driving available sections in the entire travel route are composed of the first autonomous driving available section and the second autonomous driving available section that are not contiguous with each other, if the autonomous driving mode is released as the vehicle leaves the first autonomous driving available section, the multimedia being played may be paused. In addition, if the autonomous driving mode is resumed again by entering the second autonomous driving available section, the paused multimedia may be played again from the paused portion.

As an example, the processor 120 may provide the available time for autonomous driving to a terminal. The terminal may be connected to the vehicle via a wired or wireless connection. For example, as the available time for autonomous driving is provided to a smart device of the user, the user may play the multimedia using the smart device during the autonomous driving.

Figure 2:
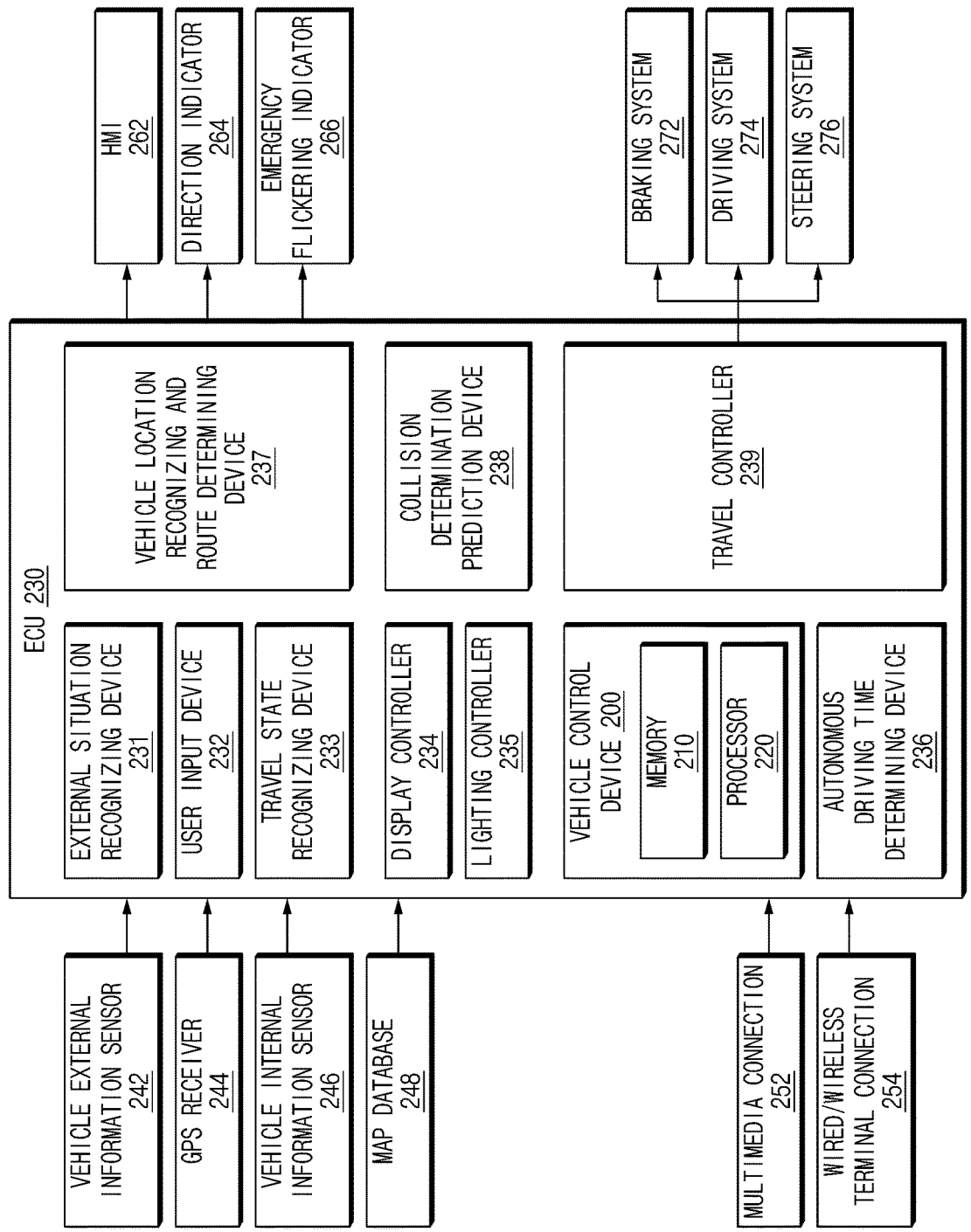
FIG. 2 is a block diagram showing an example of a vehicle control device.

FIG. 2 is a block diagram showing an example of a vehicle control device.

An example of the vehicle control device shown in FIG. 2 may include at least one of an electronic control unit (ECU) 230, a vehicle external information sensor 242, a GPS receiver 244, a vehicle internal information sensor 246, a map database 248, multimedia connection 252, a wired/wireless terminal connection 254, human machine interface (HMI) 262, a direction indicator 264, an emergency flickering indicator 266, a braking system 272, a driving system 274, or a steering system 276, or any combination thereof, but may not be necessarily limited to the example embodiments.

For example, the ECU 230 may include at least one of an external situation recognizing device 231, a user input device 232, a travel state recognizing device 233, a display controller 234, a lighting controller 235, a vehicle control device 200, an autonomous driving time determining device 236, a vehicle location recognizing and route determining device 237, a collision determination prediction device 238, or a travel controller 239, or any combination thereof.

For example, the external situation recognizing device 231 may recognize an external situation of the vehicle based on information acquired via the vehicle external information sensor 242. For example, the external situation recognizing device 231 may recognize an overall situation of a road on which the vehicle is traveling.

For example, the user input device 232 may include at least one interface. For example, the user input device 232 may acquire a signal input from the user related to the travel of the vehicle based on at least one of a touch input, a voice input, or a motion input, or any combination thereof received from the user. As a specific example, the user may input the destination or select the multimedia via the user input device 232.

For example, the travel state recognizing device 233 may recognize a travel state of the vehicle based on at least a portion of information acquired via the vehicle internal information sensor 246. For example, the travel state recognizing device 233 may recognize the travel state of the vehicle based on at least one of the travel speed, a travel direction, or a travel acceleration of the vehicle, or any combination thereof.

For example, the display controller 234 may control information displayed on the display of the vehicle or the human machine interface (HMI) 262. For example, the display controller 234 may display information on at least one of the entire travel route, the autonomous driving available section, the available time for autonomous driving, or the location of the vehicle on the entire travel route, or any combination thereof on the display, the HMI 262, and the like.

For example, the lighting controller 235 may control at least one lighting device disposed in the vehicle. For example, the lighting controller 235 may control the lighting device to indicate a lighting state corresponding to at least one of a travel direction change of the vehicle, a stopped state of the vehicle, or an emergency situation of the vehicle, or any combination thereof.

For example, the vehicle control device 200 may include a memory 210 for storing program instructions and a processor 220 for executing the program instructions stored in the memory 210.

For example, the processor 220 may execute the program instructions. For example, processor 220 may be operatively connected to at least one of the memory 210, the external situation recognizing device 231, the user input device 232, the travel state recognizing device 233, the display controller 234, the lighting controller 235, the autonomous driving time determining device 236, the vehicle location recognizing and route determining device 237, the collision determination prediction device 238, or the travel controller 239, or any combination thereof.

For example, the autonomous driving time determining device 236 may calculate the available time for autonomous driving, which is the time required in the autonomous driving available section based on the location of the vehicle on the entire travel route up to the destination. For example, the autonomous driving time determining device 236 may continuously update and calculate the available time for autonomous driving in consideration of the conditions such as at least one of the autonomous driving available section, the speed of the vehicle, or the traffic conditions up to the destination, or any combination thereof.

For example, the vehicle location recognizing and route determining device 237 may determine a travel route of the vehicle by recognizing the current location of the vehicle. For example, the vehicle location recognizing and route determining device 237 may set the destination of the vehicle and determine the entire travel route from the current location to the destination to control the travel of the vehicle.

For example, the collision determination prediction device 238 may calculate a possibility of the vehicle colliding with an external object (e.g., at least one of another vehicle, a building, a guardrail, or a person, or any combination thereof). For example, the collision determination prediction device 238 may calculate the possibility of the collision that may be caused by an area around the vehicle while controlling the autonomous driving of the vehicle.

For example, the travel controller 239 may control the autonomous driving of the vehicle by controlling at least one of the braking system 272, the driving system 274, or the steering system 276, or any combination thereof related to driving of the vehicle based on at least one of the current location, a predicted location, or the travel route of the vehicle, or any combination thereof calculated by the vehicle location recognizing and route determining device 237.

For example, the vehicle external information sensor 242 may acquire external information of the vehicle (e.g., at least one of another vehicle information or road information, weather information, or any combination thereof) using at least one sensor.

For example, the GPS receiver 244 may acquire information on the current location of the vehicle using at least one sensor.

For example, the vehicle internal information sensor 246 may acquire internal information of the vehicle (e.g., at least one of user state information, the travel state, or a component operation state, or any combination thereof) using at least one sensor.

For example, the map database 248 may include map information for identifying the current location of the vehicle. For example, the map database 248 may include information on a place including a travel location of the vehicle. As another example, the map database 248 may include information on the road including the autonomous driving available section.

For example, the multimedia connection 252 may include a connection with an external device including multimedia data.

For example, the memory storing the multimedia data, a communication device that may receive the multimedia data, or the like may be connected to the ECU 230.

For example, the wired/wireless terminal connection 254 may include a connection with a terminal (e.g., a smartphone) of the user. For example, the ECU 230 may transmit information on the available time for autonomous driving of the vehicle, the multimedia data, or the like to the wired/wireless terminal 254.

For example, the human machine interface (HMI) 262 may include at least one multimedia device (e.g., the display or the like). For example, the at least one multimedia device may include a device that is disposed on at least one of a center fascia, a windshield, a side glass, or a cluster, or any combination thereof to output information to the outside or to receive information from the outside. As a specific example, the HMI 262 may visually or audibly provide the user with at least one of the travel state of the vehicle, an autonomous driving state, or the external situation, or any combination thereof, and may receive various inputs related to the vehicle from the user.

For example, the direction indicator 264 may indicate information on the travel direction based on the travel state of the vehicle. For example, the direction indicator 264 may visually display the information on the travel direction based on control of the ECU 230.

For example, the emergency flickering indicator 266 may provide a flickering regarding the emergency situation of the vehicle. For example, the emergency flickering indicator 266 may provide a blinking indication including information indicating that a current situation of the vehicle corresponds to the emergency situation based on the control of the ECU 230.

For example, the braking system 272 may control braking of the vehicle. For example, the braking system 272 may control the braking in the autonomous driving situation of the vehicle based on the control of the travel controller 239. As a specific example, the braking system 272 may include at least one braking device (e.g., a brake).

For example, the driving system 274 may control the driving of the vehicle. For example, the driving system 274 may control the driving in the autonomous driving situation of the vehicle based on the control of the travel controller 239. As a specific example, the driving system 274 may include at least one driving device (e.g., a motor).

For example, the steering system 276 may control steering of the vehicle. For example, the steering system 276 may control the steering in the autonomous driving situation of the vehicle based on the control of the travel controller 239. As a specific example, the steering system 276 may include at least one steering device (e.g., a steering wheel or the like).

The vehicle control device may allow the user to use various convenience functions available within the available time for autonomous driving via the various components shown in FIG. 2 or by providing information related to the autonomous driving of the vehicle including the available time for autonomous driving or the like to the user together with the various components.

Figure 3:
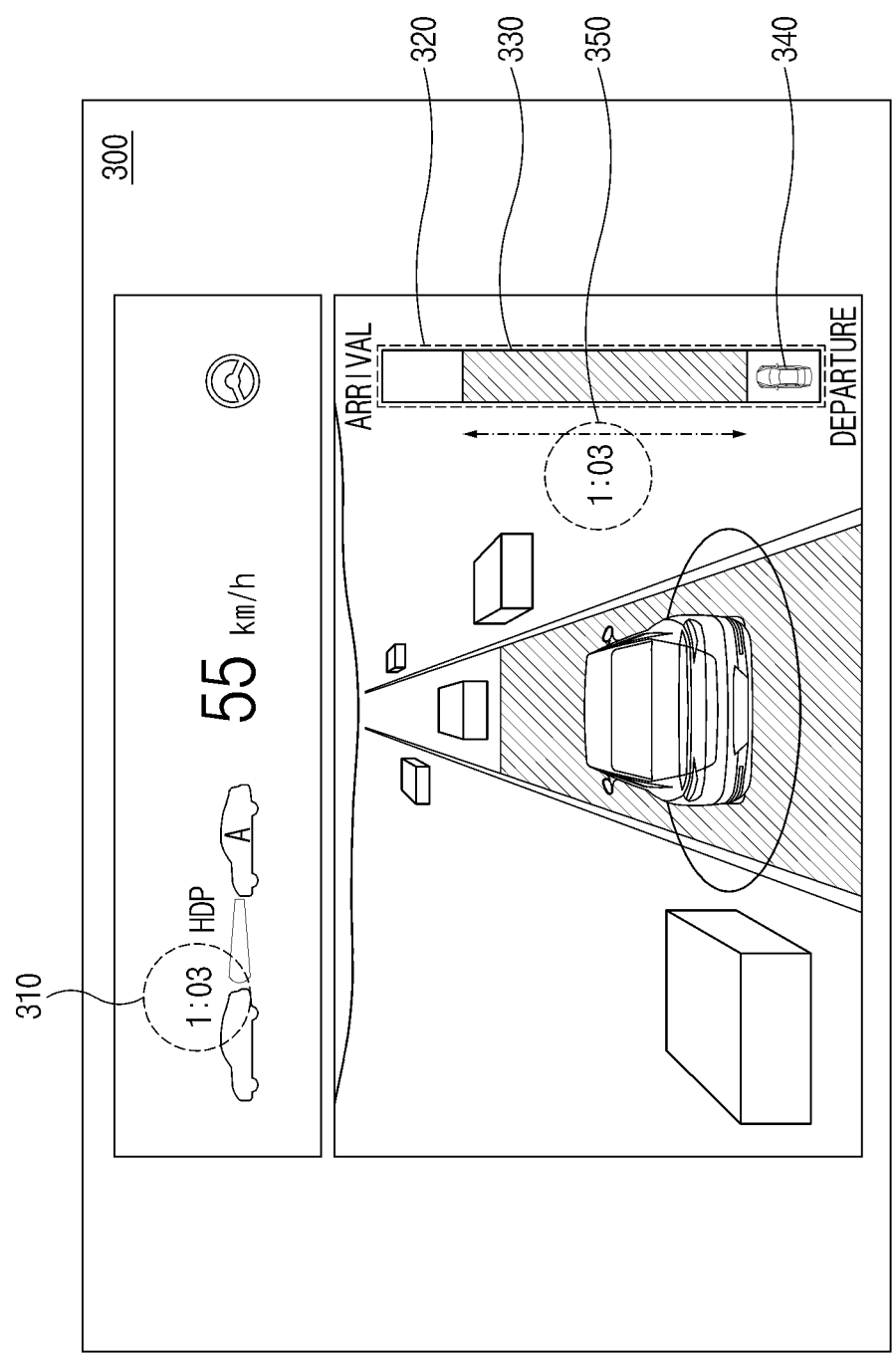
FIG. 3 is a diagram showing an example screen in which information including an available time for autonomous driving and an autonomous driving available section is displayed on a display in a vehicle control device.

FIG. 3 is a diagram showing an example screen in which information including an available time for autonomous driving and an autonomous driving available section is displayed on a display in a vehicle control device.

Referring to FIG. 3, the vehicle control device may display an available time for autonomous driving 350 corresponding to an autonomous driving available section 330 in an entire travel route 320 to the destination on a display 300 of the vehicle.

For example, the autonomous driving available section 330 may be displayed to be distinguished on the entire travel route 320 to the destination. For example, the entire travel route 320 and the autonomous driving available section 330 may be displayed in different colors. Specifically, the autonomous driving available section 330 in the entire travel route 320 may be displayed in blue and a section where the vehicle is not able to travel in the autonomous driving mode may be displayed in white.

For example, the autonomous driving available section 330 may be displayed on the display 300 based on a ratio of a length of the section where the vehicle is able to travel in the autonomous driving mode to a length of the entire travel route 320. For example, if the length of the entire travel route 320 is 10 km and the length of the section where the vehicle is able to travel in the autonomous driving mode in the entire travel route 320 is 6 km, the entire travel route 320 and the autonomous driving available section 330 may be displayed on the display 300 in a length ratio corresponding to 10:6.

For example, the vehicle control device may display the available time for autonomous driving 350 corresponding to the autonomous driving available section 330 on the display 300 together with the autonomous driving available section 330. In this regard, the available time for autonomous driving 350 corresponding to the autonomous driving available section 330 may be a time calculated by reflecting the speed of the vehicle, the surrounding traffic conditions, and the like, and may not change even while the vehicle is traveling in the autonomous driving available section 330. In other words, the available time for autonomous driving 350 corresponding to the autonomous driving available section 330 may not mean the available time for autonomous driving remaining based on the current location of the vehicle in the corresponding autonomous driving available section 330. The user may identify the available time for autonomous driving 350 corresponding to the autonomous driving available section 330 in advance and refer to the available time for autonomous driving 350 when utilizing a multimedia function.

For example, the location of the vehicle may be displayed on the entire travel route 320 and may be expressed as an icon, an image, or the like 340 that may represent the current location of the vehicle. The location of the vehicle may start at a 'departure' point and move to an 'arrival' point as the vehicle travels toward the destination.

For example, the vehicle control device may display an available time for autonomous driving 310 required in the autonomous driving available section in the entire travel route 320 to the destination based on the location of the vehicle on the display 300. For example, if the available time for autonomous required in the autonomous driving available section based on the location of the vehicle may be displayed as a time the same as the available time for autonomous driving 350 corresponding to the corresponding autonomous driving available section 330 if it is before the vehicle enters the autonomous driving available section 330, and may be displayed as the available time for autonomous driving remaining until the corresponding autonomous driving available section 330 ends if it is after the vehicle enters the autonomous driving available section 330.

As a specific example, if the available time for autonomous driving 350 corresponding to the autonomous driving available section 330 is 1 hour and 3 minutes, the available time for autonomous driving 310 required in the autonomous driving available section based on the location of the vehicle may be displayed as 1:03 corresponding to 1 hour and 3 minutes if it is before the vehicle enters the autonomous driving available section, and the available time for autonomous driving 310 required in the autonomous driving available section based on the location of the vehicle may be displayed as 0:33 corresponding to 33 minutes, which is a remaining time until the autonomous driving available section 330 ends, if the vehicle has traveled for 30 minutes under the autonomous driving after entering the autonomous driving available section.

As shown in FIG. 3, as the autonomous driving available section included in the entire travel route and the available time for autonomous driving are provided to the user via the example screen in which the information including the available time for autonomous driving and the autonomous driving available section is displayed on the display, the vehicle control device may promote convenience of the user such as selecting the content that may be played in consideration of the available time for autonomous driving.

Figure 4:
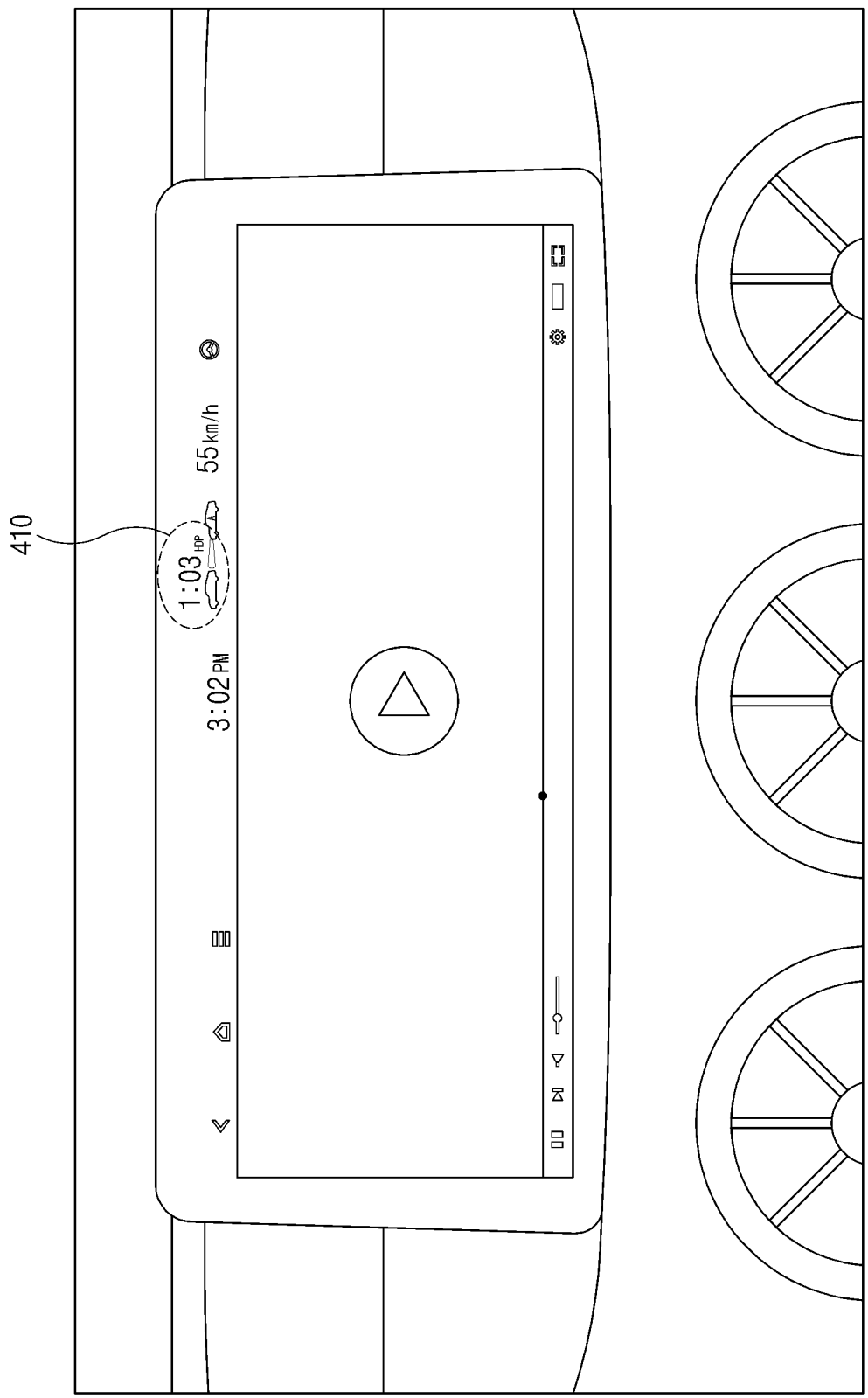
FIG. 4 is a diagram showing a display on which a multimedia playback screen containing an available time for autonomous driving is displayed in a vehicle control device.

FIG. 4 is a diagram showing a display on which a multimedia playback screen containing an available time for autonomous driving is displayed in a vehicle control device.

Referring to FIG. 4, the vehicle control device may display an available time for autonomous driving 410 on the display on which the multimedia playback screen is displayed.

For example, the user may identify the available time for autonomous driving 410 even while the multimedia is being played. In this regard, the available time for autonomous driving 410 may be the available time for autonomous driving required in the autonomous driving available section based on the location of the vehicle.

As shown in FIG. 4, the user may identify the available time for autonomous driving 410 even while viewing the multimedia video.

Figure 5:
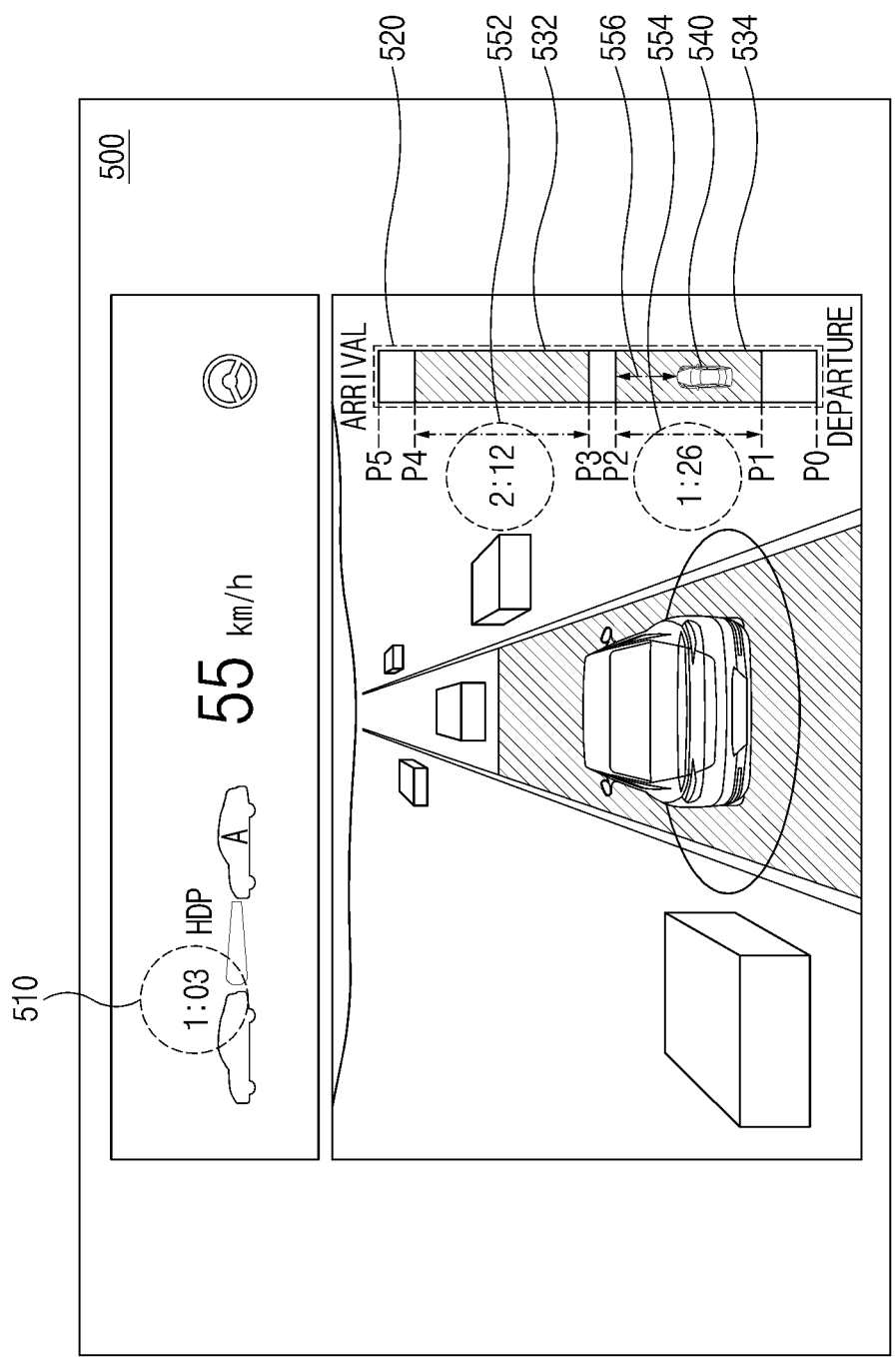
FIG. 5 shows an example screen in which information including an available time for autonomous driving and an autonomous driving available section is displayed on a display when the number of autonomous driving available sections in an entire travel route of a vehicle is equal to or longer than two in a vehicle control device.

FIG. 5 shows an example screen in which information including an available time for autonomous driving and an autonomous driving available section is displayed on a display if the number of autonomous driving available sections in an entire travel route of a vehicle is equal to or longer than two in a vehicle control device.

Referring to FIG. 5, if autonomous driving available sections in an entire travel route 520 of the vehicle are two sections 532 and 534, the vehicle control device may display available times for autonomous driving 552 and 554 respectively corresponding to the sections 532 and 534 on a display 500 of the vehicle.

As an example, the entire travel route 520 of the vehicle may include the first autonomous driving available section 534 and the second autonomous driving available section 532 where the vehicle is able to travel in the autonomous driving mode, the first autonomous driving available section 534 may mean a section from a point P1 to a point P2, and the second autonomous driving available section 532 may mean a section from a point P3 to a point P4.

As an example, the first autonomous driving available section 534 may be displayed on the display 500 based on a ratio of a length of the first autonomous driving available section 534 to a length of the entire travel route 520, and the second autonomous driving available section 532 may be displayed on the display 500 based on a ratio of a length of the second autonomous driving available section 532 to the length of the entire travel route 520.

For example, the location of the vehicle may be displayed on the entire travel route 520 and may be expressed as an icon, an image, or the like 540 that may indicate the current location of the vehicle. The location of the vehicle starts at a 'departure' point and move to an 'arrival' point as the vehicle travels toward the destination.

For example, the vehicle control device may display the first autonomous driving available section 534 and the first available time for autonomous driving 554 corresponding thereto, and the second autonomous driving available section 532 and the second available time for autonomous driving 552 corresponding thereto on the display 500.

As another example, the vehicle control device may display an available time for autonomous driving 510 required in the autonomous driving available section 534 in the entire travel route 520 to the destination based on the location of the vehicle on the display 500.

For example, if the vehicle is traveling between the point P0 and the point P1, because it is before entering the first autonomous driving available section 534, the available time for autonomous driving 510 required in the autonomous driving available section 534 based on the location of the vehicle may be displayed as 1:26 corresponding to the first available time for autonomous driving 554.

For example, if the vehicle has traveled for 23 minutes in the autonomous driving mode after entering the first autonomous driving available section 534, the available time for autonomous driving 510 required in the autonomous driving available section 534 based on the location of the vehicle may be displayed as 1:03, which is the available time for autonomous driving remaining up to a point where the first autonomous driving available section ends.

For example, if the vehicle is traveling between the point P2 and the point P3, because it is before entering the second autonomous driving available section 532, the available time for autonomous driving 510 required in the autonomous driving available section 532 based on the location of the vehicle may be displayed as 2:12 corresponding to the second available time for autonomous driving 552.

As another example, when recommending content that may be played, the vehicle control device may compare a playback time of the content with 3 hours 38 minutes, which is a sum of 1 hour 26 minutes that is the first available time for autonomous driving 554 and 2 hours 12 minutes that is the second available time for autonomous driving 552, that is the total available time for autonomous driving. For example, the vehicle control device may recommend content having a playback time equal to or shorter than 3 hours 38 minutes, which is the total available time for autonomous driving. In this regard, if there are at least two content that may complete the playback within the total available time for autonomous driving, all of the at least two contents may be recommended.

Figure 6A:
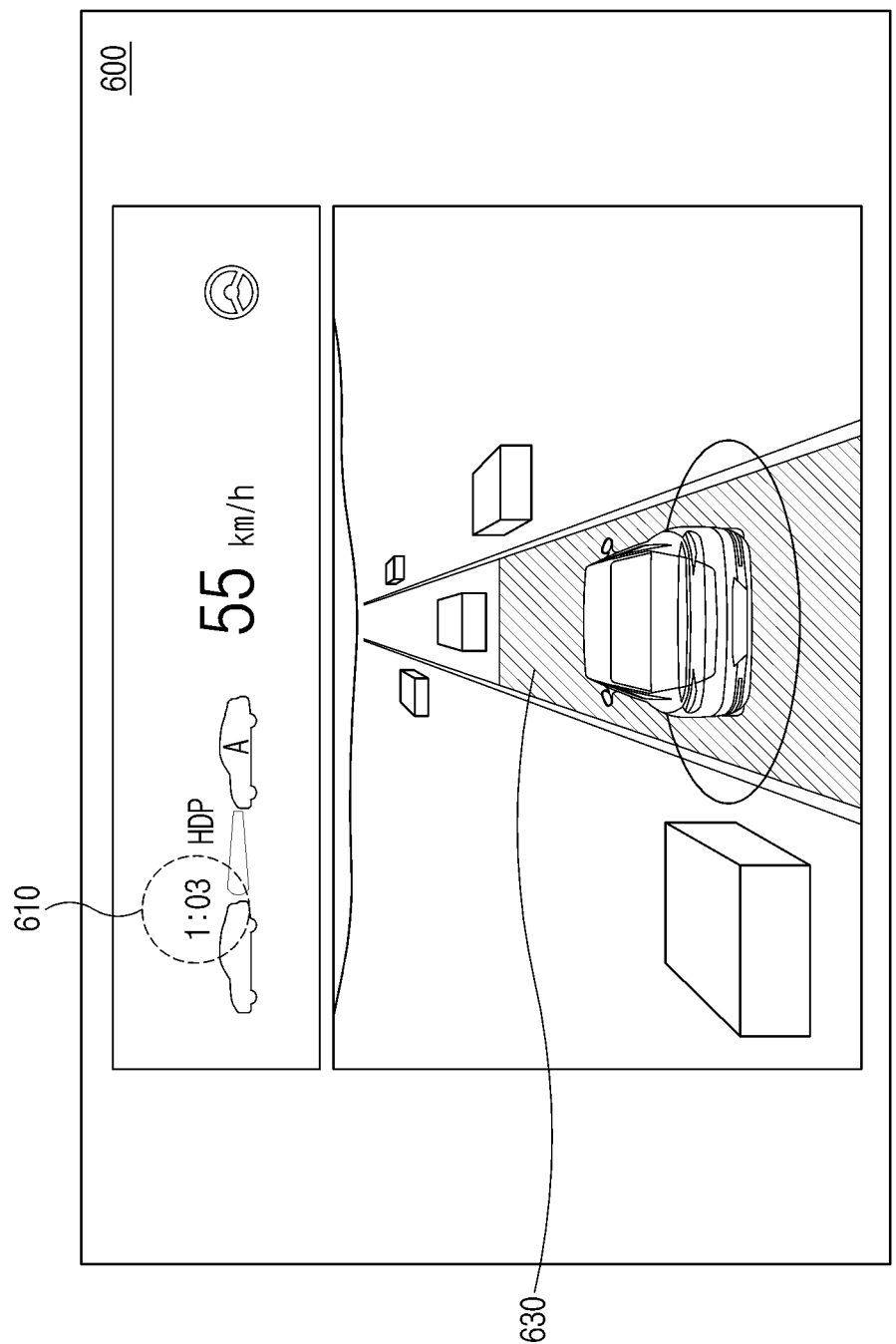
FIG. 6A is a diagram showing an example screen displayed on a display when a vehicle is normally under autonomous driving in a vehicle control device.

FIG. 6A is a diagram showing an example screen displayed on a display if a vehicle is normally under autonomous driving in a vehicle control device.

Figure 6B:
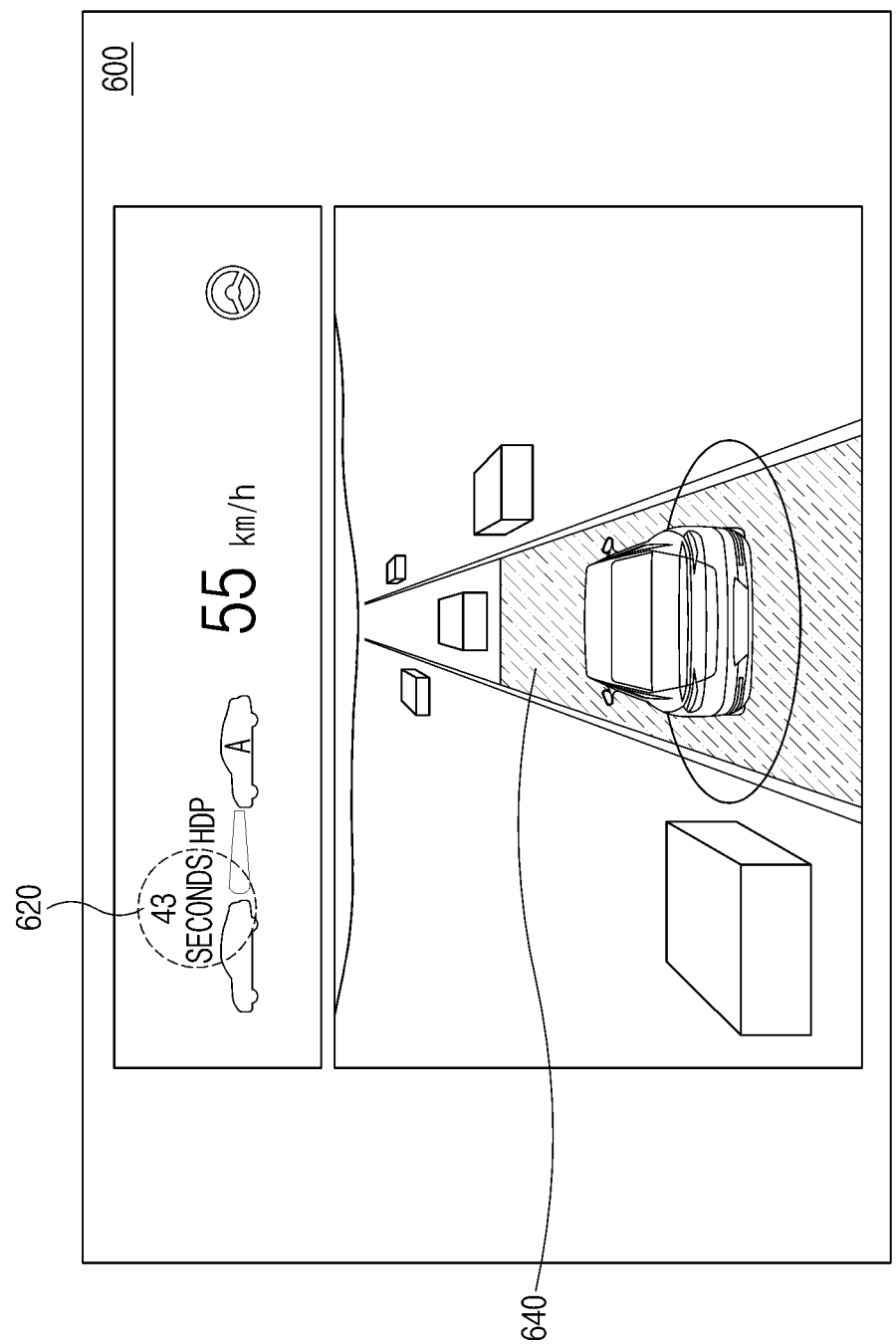
FIG. 6B is a diagram showing an example screen displayed on a display when an event in which autonomous driving is not able to be continued occurs during the autonomous driving of a vehicle in a vehicle control device.

FIG. 6B is a diagram showing an example screen displayed on a display if an event in which autonomous driving is not able to be continued (e.g., an event that causes autonomous driving to be deactivated) occurs during the autonomous driving of a vehicle in a vehicle control device.

Referring to FIGS. 6A and 6B, the vehicle control device may include information on at least one of available times for autonomous driving 610 and 620 required in the autonomous driving available section based on the location of the vehicle, a virtual vehicle virtually representing the vehicle in travel, or virtual roads 630 and 640 that may represent a travel mode, or any combination thereof on a display 600.

As an example of FIG. 6A, if the vehicle is normally under the autonomous driving, the available time for autonomous driving 610 required in the autonomous driving available section based on the location of the vehicle may be displayed on the display 600 in hour/minute units.

As another example of FIG. 6A, the vehicle control device may change a color representing the virtual road 630 and display the virtual road 630 on the display 600 based on whether the vehicle is traveling in the autonomous driving mode. For example, if the vehicle is not traveling in the autonomous driving mode, the virtual road 630 may be displayed in black, and if the vehicle is traveling in the autonomous driving mode, the virtual road 630 may be displayed in blue.

As an example of FIG. 6B, the vehicle control device may display and provide the available time for autonomous driving 620 on the display 600 of the vehicle if the event in which the autonomous driving is not able to be continued occurs during the autonomous driving of the vehicle. For example, the available time for autonomous driving 620 required in the autonomous driving available section based on the location of the vehicle may be displayed on the display 600 after changing the hour/minute units to seconds units. In this case, the available time for autonomous driving 620 displayed in the second units and the available time for autonomous driving displayed in the hour/minute units may be displayed in different colors. As a specific example, the available time for autonomous driving displayed in the hour/minute units may be displayed in white, and the available time for autonomous driving 620 displayed in the second units may be displayed in red.

As another example of FIG. 6B, the vehicle control device may change a color of the virtual road 640 and display the virtual road 640 if the event in which the autonomous driving is not able to be continued occurs during the autonomous driving of the vehicle. For example, the vehicle control device may change the color of the virtual road 640, which has been displayed in blue before the event in which the autonomous driving is not able to be continued occurs, to red and display the virtual road 640 after the event in which the autonomous driving is not able to be continued occurs. In this case, after the event in which the autonomous driving is not able to be continued occurs, the virtual road 640 displayed in the red may be displayed while flickering repeatedly.

As shown in FIGS. 6A and 6B, if the event in which the autonomous driving is not able to be continued occurs during the autonomous driving, safe driving may be promoted by clearly recognizing a time point (e.g., a location) at which the autonomous driving mode is released via the available time for autonomous driving 620 displayed in the second units and the virtual road 640 displayed in the changed color.

Figure 7:
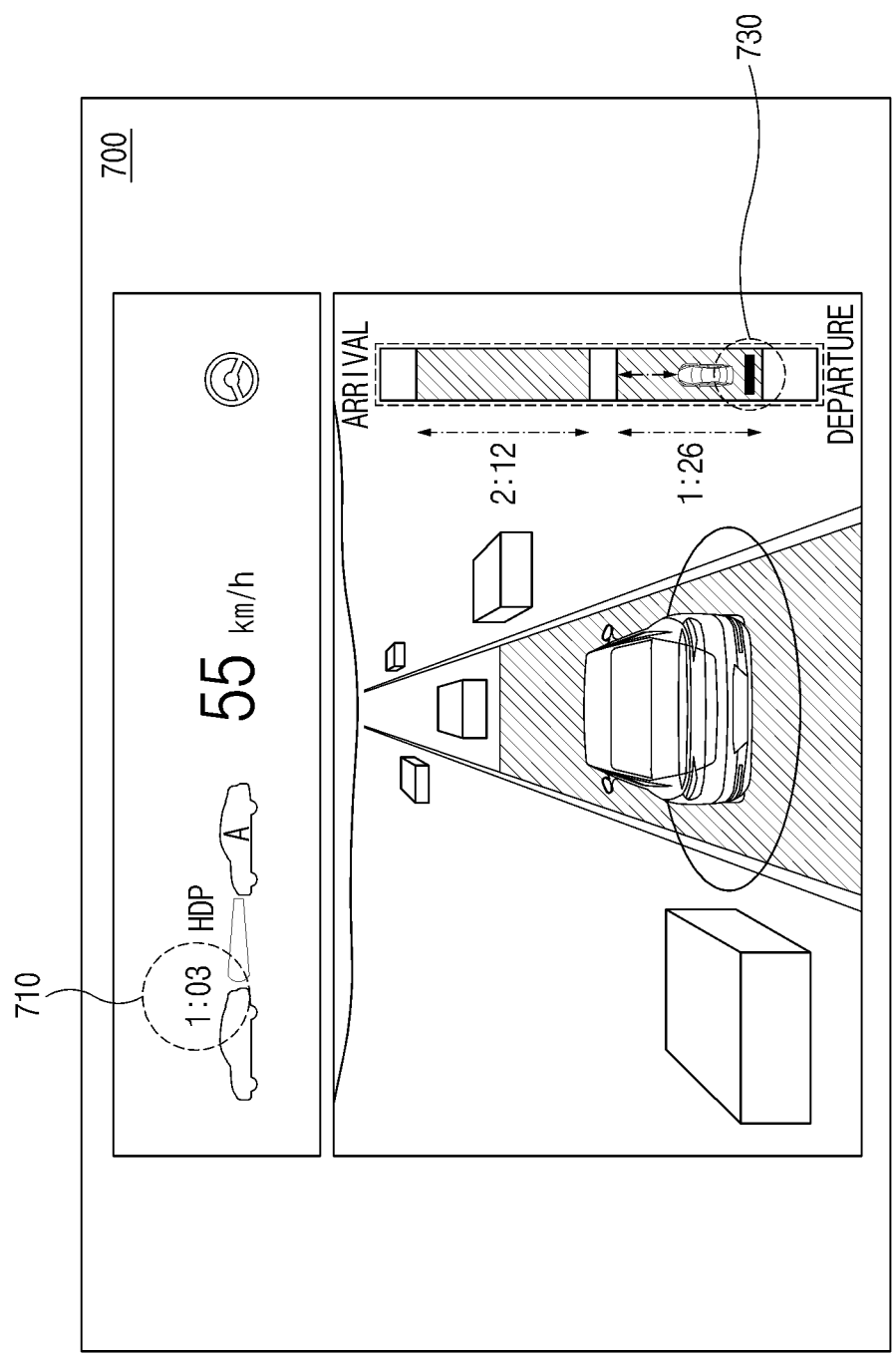
FIG. 7 is a view showing an example screen in which a point at which an event has occurred in an autonomous driving available section is displayed on a display when the event in which autonomous driving is not able to be continued has occurred in a vehicle control device.

FIG. 7 is a view showing an example screen in which a point at which an event has occurred in an autonomous driving available section is displayed on a display if the event in which autonomous driving is not able to be continued has occurred in a vehicle control device.

Referring to FIG. 7, the vehicle control device may display at least one of an available time for autonomous driving 710) required in the autonomous driving available section in the entire travel route to the destination based on the location of the vehicle or a point 730 at which an event has occurred, or any combination thereof on a display 700.

For example, if the event in which the autonomous driving is not able to be continued (e.g., an event that causes autonomous driving to be deactivated) occurs during the autonomous driving of the vehicle, the vehicle control device may display the autonomous driving available section and the point 730 at which the event has occurred on the display 700 of the vehicle or store the autonomous driving available section and the point 730 at which the event has occurred in the memory.

For example, if the event in which the autonomous driving is not able to be continued occurs during the autonomous driving in the autonomous driving available section of the vehicle, the vehicle control device may display the point 730 at which the event has occurred in the autonomous driving available section. In this regard, the event in which the autonomous driving is not able to be continued may include at least one of a case of requesting the user to transfer control rights (TD, Transition Demand), a case corresponding to a risk minimization travel (MRM, Minimum Risk Maneuver), a case corresponding to an emergency situation travel (EM, Emergency Maneuver), or a case in which road construction is in progress ahead, or any combination thereof.

As shown in FIG. 7, the vehicle control device may reflect information on the point 730 at which the event in which the autonomous driving is not able to be continued has occurred in the map information or the like, so that the user may visually identify a location of the point 730 at which the event in which the autonomous driving is not able to be continued has occurred on the entire travel route.

Figure 8:
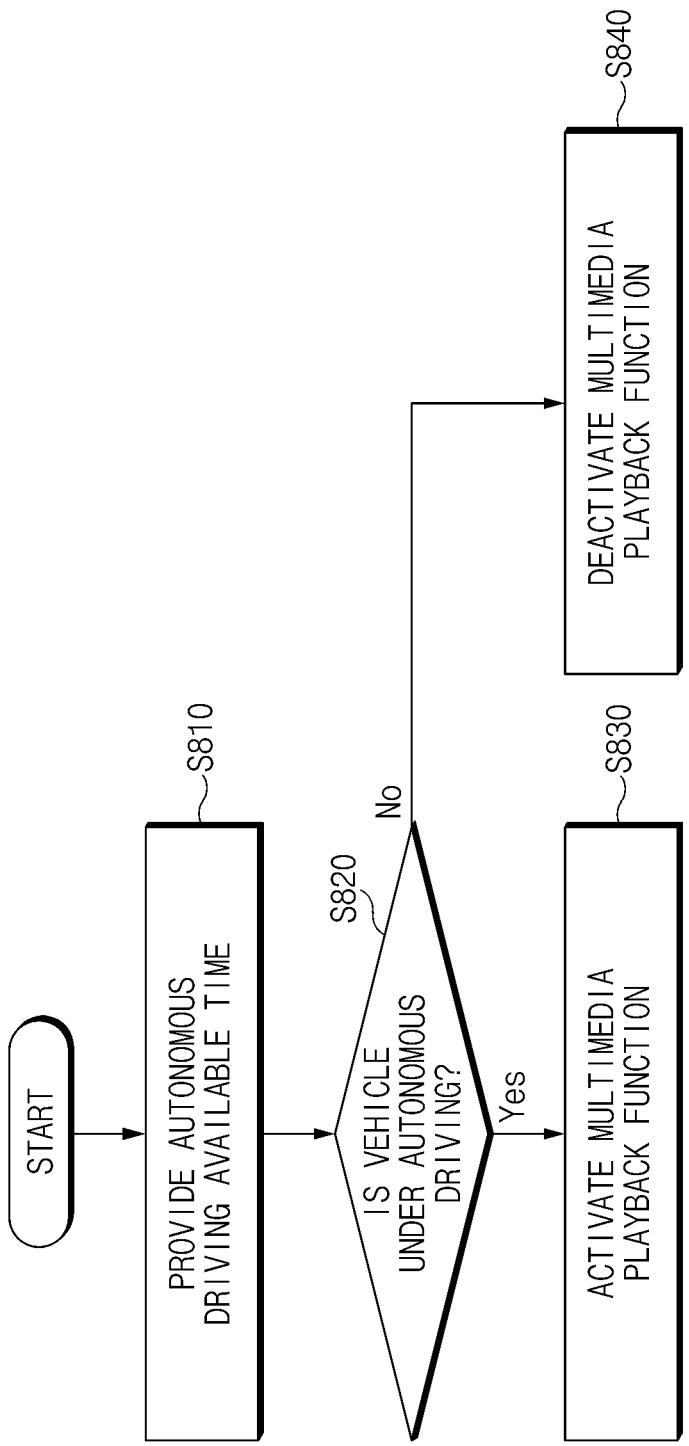
FIG. 8 is a flowchart showing a vehicle control method.

FIG. 8 is a flowchart showing a vehicle control method.

Hereinafter, it may be assumed that the processor 120 in FIG. 1 performs a process in FIG. 8.

Referring to FIG. 8, in an example vehicle control, the processor may receive the available time for autonomous driving from the vehicle. In this regard, the available time for autonomous driving may include the time required in the autonomous driving available section in the entire travel route to the destination based on the location of the vehicle.

As an example, the processor may provide the available time for autonomous driving calculated by the vehicle to at least one of the display or the audio of the vehicle, or any combination thereof (S810), and the processor may determine whether the vehicle is under the autonomous driving (S820).

For example, if the vehicle is under the autonomous driving (Yes in S820), the processor may activate a multimedia playback function of the vehicle (S830). In this case, the user may play the multimedia including the video during the autonomous driving of the vehicle.

For example, if the vehicle is not under the autonomous driving (No in S820), the processor may deactivate the multimedia playback function of the vehicle (S840). In this case, the user is not able to play the multimedia including the video during the travel of the vehicle.

Figure 9:
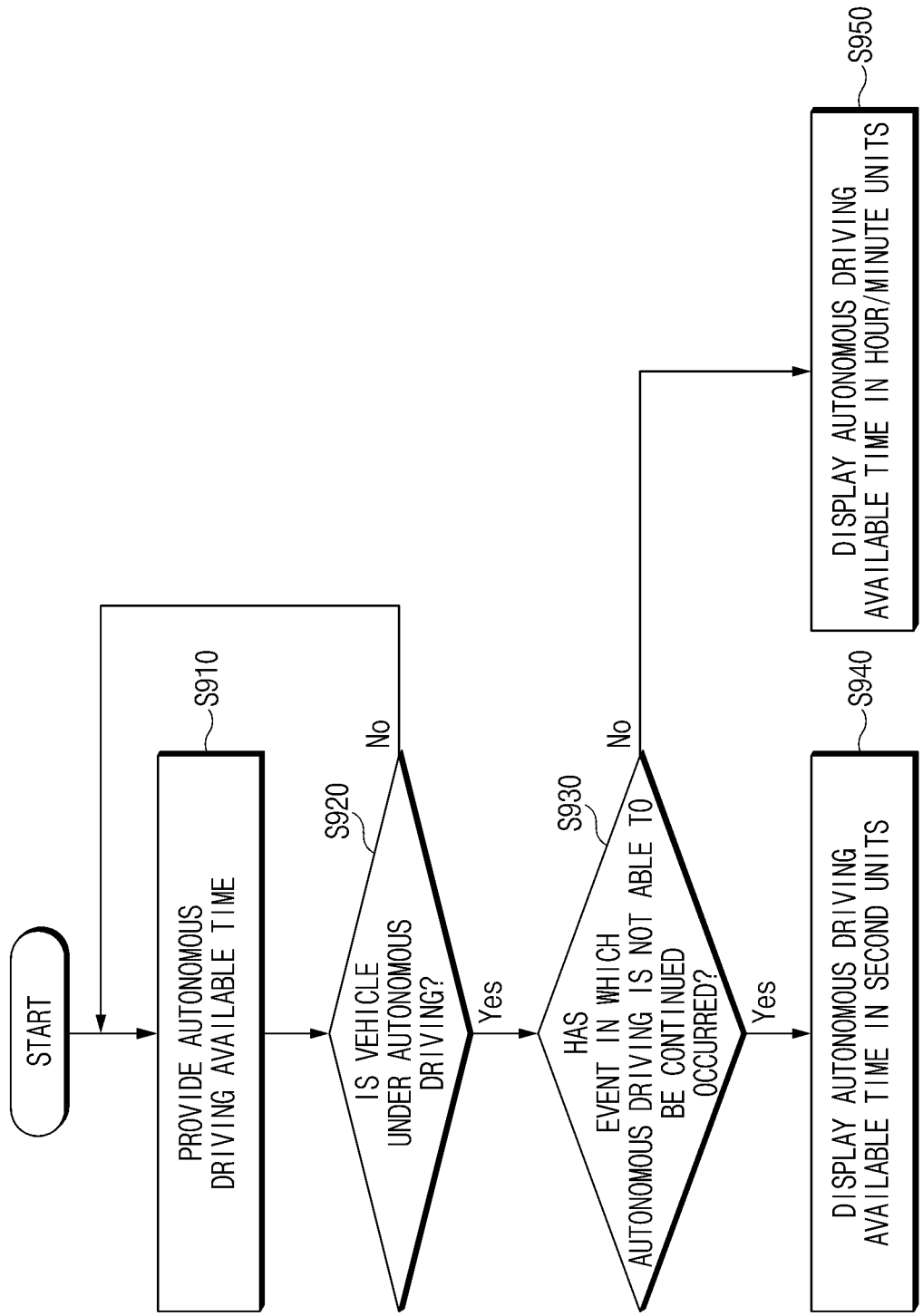
FIG. 9 is a flowchart showing a method for displaying an available time for autonomous driving when an event in which autonomous driving is not able to be continued occurs in a vehicle control method.

FIG. 9 is a flowchart showing a method for displaying an available time for autonomous driving if an event in which autonomous driving is not able to be continued occurs in a vehicle control method.

Referring to FIG. 9, in an example vehicle control method, the processor may receive the available time for autonomous driving from the vehicle. In this regard, the available time for autonomous driving may include the time required in the autonomous driving available section in the entire travel route to the destination based on the location of the vehicle.

For example, the processor may provide the available time for autonomous driving calculated by the controller of the vehicle to at least one of the display or the audio of the vehicle, or any combination thereof (S910).

As an example, the processor may determine whether the vehicle is under the autonomous driving (S920).

For example, if the vehicle is not under the autonomous driving (No in S920), the processor may return to operation (S910) of providing the available time for autonomous driving normally calculated by the controller of the vehicle to at least one of the display or the audio of the vehicle, or any combination thereof.

For example, if the vehicle is under the autonomous driving (Yes in S920), whether the event in which the autonomous driving is not able to be continued has occurred may be determined.

For example, if the event in which the autonomous driving is not able to be continued has occurred (Yes in S930), the processor may display and provide the available time for autonomous driving on the display of the vehicle. As a specific example, the processor may display the available time for autonomous driving in the second units (S940). In this regard, the color of the available time for autonomous driving displayed in the second units may be different from the color of the available time for autonomous driving displayed in the hour/minute units.

For example, if the event in which the autonomous driving is not able to be continued has not occurred (No in S930), the processor may display the available time for autonomous driving in the hour/minute units (S950).

Figure 10:
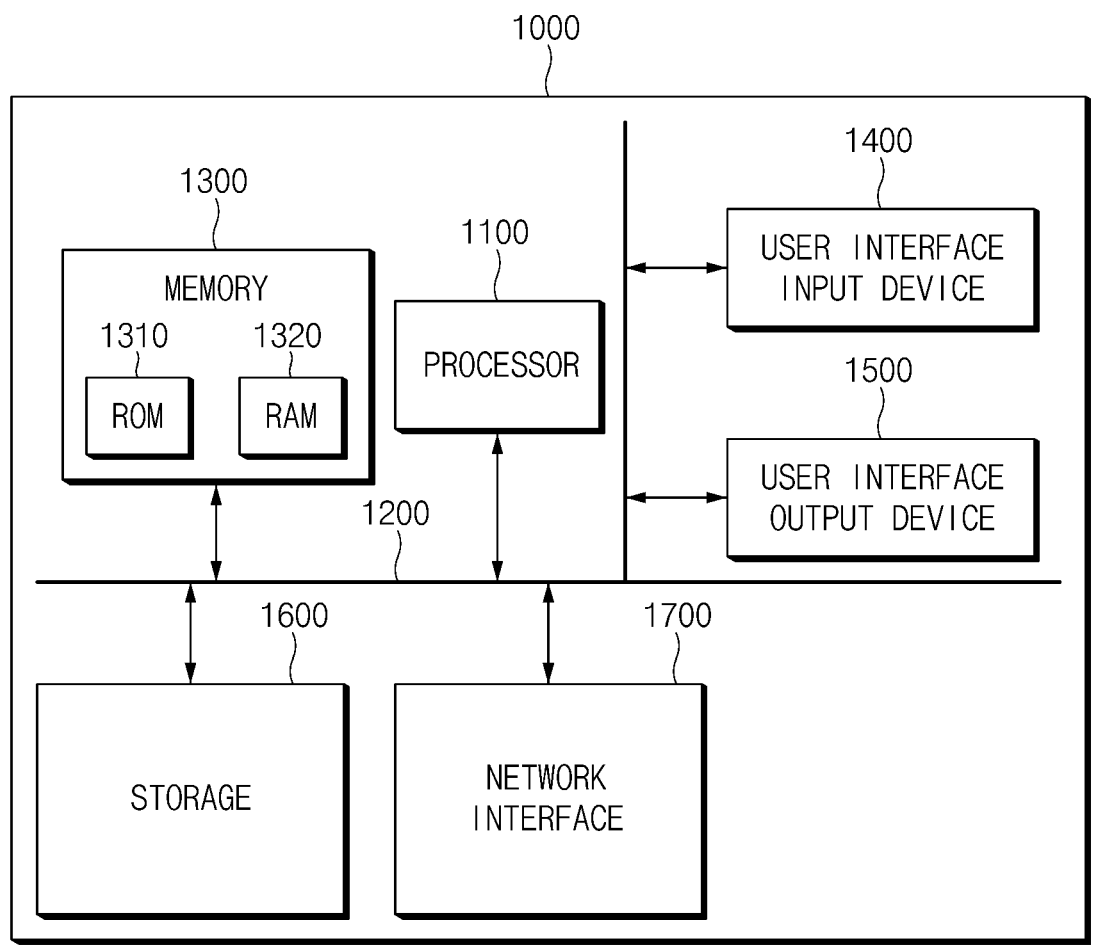
FIG. 10 shows a computing system.

FIG. 10 shows a computing system.

With reference to FIG. 10, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the one or more example embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

For example, the storage medium is coupled to the processor 1100, which may read information from, and write information to, the storage medium. In another method, the storage medium may be integral with the processor 1100.

The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the example embodiment(s) disclosed in the present disclosure are not intended to limit the technical idea of the present disclosure but to illustrate the present disclosure, and the scope of the technical idea of the present disclosure is not limited by the embodiment(s). The scope of the present disclosure should be construed as being covered by the scope of the appended claims, and all technical ideas falling within the scope of the claims should be construed as being included in the scope of the present disclosure.

The present technology provides the user with the available time for autonomous driving in the entire travel route to the destination, so that the user may use the various convenience functions available within the available time for autonomous driving.

In addition, the present technology determines whether the vehicle is under the autonomously driving and, if the vehicle is under the autonomous driving, allows the playback of the multimedia, so that the user may use the multimedia function within the available time for autonomous driving.

In addition, the present technology recommends the content that may complete the playback within the available time for autonomous driving or recommends the playback speed of the multimedia for completing the playback within the available time for autonomous driving, so that the convenience may be enhanced if the user selects the content that may be utilized within the available time for autonomous driving.

In addition, the present technology displays the available time for autonomous driving in the second units or displays the event occurrence point on the display if the event in which the autonomous driving is not able to be continued occurs during the autonomous driving of the vehicle, so that the user may actively respond to the event in which the autonomous driving is not able to be continued and improve the convenience in utilizing the multimedia.

In addition, various effects identified directly or indirectly through the present document may be provided.

Hereinabove, although the present disclosure has been described with reference to example embodiment(s) and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a vehicle, the device comprising:
    memory configured to store program instructions; and
    a processor configured to execute the program instructions,
    wherein the processor is configured to:
        output, via at least one of a display of the vehicle or an audio system of the vehicle, an available autonomous driving travel time associated with a portion, of a travel route to a destination, that is suitable for autonomous driving, wherein the available autonomous driving travel time is determined based on a location of the vehicle; and
        based on a determination that autonomous driving is activated for the vehicle, allow media playback in the vehicle,
    wherein the processor is further configured to calculate, the available autonomous driving travel time based on a speed of the vehicle and surrounding traffic conditions.

2. The device of claim 1, wherein the processor is configured to output the available autonomous driving travel time by displaying at least one of: an entirety of the travel route, the portion suitable for autonomous driving, the available autonomous driving travel time associated with the portion suitable for autonomous driving, or the location of the vehicle on the travel route, and
    wherein the portion suitable for autonomous driving is determined to be shorter than an entire driving path of the travel route.

3. The device of claim 1, wherein the processor is further configured to determine a recommended media content having a playback time that is less than or equal to the available autonomous driving travel time, and
    wherein at least one available autonomous driving travel time is determined by excluding a driving travel time on at least one portion, of the travel route, that is unsuitable for autonomous driving of the vehicle.

4. The device of claim 1, wherein the processor is further configured to determine, based on a playback time of a media content being greater than the available autonomous driving travel time, a recommended playback speed of the media content for completing playback of the media content within the available autonomous driving travel time.

5. The device of claim 1, wherein the processor is further configured to:
    receive a selection of a playback speed; and
    determine a recommended media content, wherein a playback time of the recommended media content at the selected playback speed is less than or equal to the available autonomous driving travel time.

6. The device of claim 1, wherein the processor is further configured to:
    start playback of a media content based on autonomous driving of the vehicle being activated;
    pause playback of the media content based on autonomous driving being deactivated; and
    resume playback of the media content from a paused position based on autonomous driving being re-activated.

7. The device of claim 1, wherein the processor is further configured to:
    identify a second portion, of the travel route, that is determined to be unsuitable for autonomous driving of the vehicle; and
    based on the portion, of the travel route, comprising at least two separate sections of the travel route, output, via at least one of the display or the audio system:
        at least two travel times, each associated with a respective section of the at least two separate sections of the travel route, and
        the at least two separate sections of the travel route,
    wherein the at least two travel times are determined based on the location of the vehicle in one of the at least two separate sections of the travel route,
    wherein the second portion of the travel route corresponds to a section of the travel route between the at least two separate sections, and wherein the processor is further configured to disable playback of a visual content during a driving of the vehicle on the second portion of the travel route.

8. The device of claim 1, wherein the processor is configured to output the available autonomous driving travel time based on an event that causes autonomous driving to be deactivated.

9. The device of claim 1, wherein the processor is further configured to, based on an event that causes autonomous driving to be deactivated, store in the memory or display:
the portion, of the travel route, suitable for autonomous driving, and
a location where the event has occurred.

10. The device of claim 1, wherein the processor is further configured to provide the available autonomous driving travel time to a terminal, wherein the terminal is connected to the vehicle via a wired or wireless connection.

11. A method for controlling a vehicle, the method comprising:
outputting, by a processor and via at least one of a display of the vehicle or an audio system of the vehicle, an available autonomous driving travel time associated with a portion, of a travel route to a destination, that is suitable for autonomous driving, wherein the available autonomous driving travel time is determined based on a location of the vehicle, and wherein the available autonomous driving travel time is calculated based on a speed of the vehicle and surrounding traffic conditions; and
based on a determination that autonomous driving is activated for the vehicle, allowing, by the processor, media playback in the vehicle.

12. The method of claim 11, wherein the outputting of the available autonomous driving travel time comprises:
displaying at least one of: an entirety of the travel route, the portion suitable for autonomous driving, the available autonomous driving travel time associated with the portion suitable for autonomous driving, or the location of the vehicle on the travel route, and
wherein the portion suitable for autonomous driving is determined to be shorter than an entire driving path of the travel route.

13. The method of claim 11, further comprises:
determining a recommended media content having a playback time that is less than or equal to the available autonomous driving travel time, wherein at least one available autonomous driving travel time is determined by excluding a driving travel time on at least one portion, of the travel route, that is unsuitable for autonomous driving of the vehicle.

14. The method of claim 11, further comprises:
determining, based on a playback time of a media content being greater than the available autonomous driving travel time, a recommended playback speed of the media content for completing playback of the media content within the available autonomous driving travel time.

15. The method of claim 11, further comprising:
receiving a selection of a playback speed; and
determining a recommended media content, wherein a playback time of the recommended media content at the selected playback speed is less than or equal to the available autonomous driving travel time.

16. The method of claim 11, further comprising:
starting playback of a media content based on autonomous driving of the vehicle being activated;
pausing, by the processor, playback of the media content based on autonomous driving being deactivated; and
resuming playback of the media content from a paused position based on autonomous driving being re-activated.

17. The method of claim 11, further comprising:
identifying a second portion, of the travel route, that is determined to be unsuitable for autonomous driving of the vehicle; and
based on the portion, of the travel route, comprising at least two separate sections of the travel route, outputting, by the processor via at least one of the display or the audio system:
at least two travel times, each associated with a respective section of the at least two separate sections of the travel route, and
the at least two separate sections of the travel route,
wherein the at least two travel times are determined based on the location of the vehicle in one of the at least two separate sections of the travel route,
wherein the second portion of the travel route corresponds to a section of the travel route between the at least two separate sections, and
wherein the processor is further configured to disable playback of a visual content during a driving of the vehicle on the second portion of the travel route.

18. The method of claim 11, wherein the outputting of the available autonomous driving travel time comprises outputting the available autonomous driving travel time based on an event that causes autonomous driving to be deactivated.

19. The method of claim 11, further comprising:
based on an event that causes autonomous driving to be deactivated, storing or displaying:
the portion, of the travel route, suitable for autonomous driving, and
a location where the event has occurred.

20. A device for controlling a vehicle, the device comprising:
memory configured to store program instructions; and
a processor configured to execute the program instructions,
wherein the processor is configured to:
based on a first available autonomous driving travel time associated with a first portion, of a travel route to a destination, that is suitable for autonomous driving, output, during performing an autonomous driving operation of the vehicle, a video content via a display of the vehicle, wherein the first available autonomous driving travel time is determined based on a location of the vehicle;
based on a second portion, of the travel route, that is unsuitable for autonomous driving of the vehicle, deactivate the autonomous driving operation of the vehicle, stop playback of the video content, and output an audio content via an audio system of the vehicle; and
based on a second available autonomous driving travel time associated with a third portion, of the travel route, that is suitable for autonomous driving, resume, during performing a resumed autonomous driving operation of the vehicle, playback of the remaining portion of the video content via the display of the vehicle.

* * * * *